US007113073B2

(12) United States Patent
Taylor et al.

(10) Patent No.: US 7,113,073 B2
(45) Date of Patent: Sep. 26, 2006

(54) SYSTEM MANAGEMENT INTERFACE FOR RADIO FREQUENCY ACCESS CONTROL

(75) Inventors: Ronald Taylor, Wheaton, IL (US); James F. Wiemeyer, Homer Glen, IL (US)

(73) Assignee: Harrow Products, LLC, Montvale, NJ (US)

( * ) Notice: Subject to any disclaimer, the term of this patent is extended or adjusted under 35 U.S.C. 154(b) by 155 days.

(21) Appl. No.: 10/262,196

(22) Filed: Sep. 30, 2002

(65) Prior Publication Data

US 2003/0098778 A1 May 29, 2003

Related U.S. Application Data

(60) Provisional application No. 60/326,338, filed on Sep. 30, 2001, provisional application No. 60/326,299, filed on Sep. 30, 2001, provisional application No. 60/326,201, filed on Sep. 30, 2001, provisional application No. 60/326,316, filed on Sep. 30, 2001, provisional application No. 60/326,298, filed on Sep. 30, 2001, provisional application No. 60/326,179, filed on Sep. 30, 2001, provisional application No. 60/326,296, filed on Sep. 30, 2001, provisional application No. 60/326,294, filed on Sep. 30, 2001, provisional application No. 60/326,295, filed on Sep. 30, 2001.

(51) Int. Cl.
*G05B 19/00* (2006.01)
*G05B 23/00* (2006.01)
*G06F 7/00* (2006.01)
*G06F 7/04* (2006.01)
*G06K 19/00* (2006.01)

(52) U.S. Cl. ............... 340/5.27; 340/5.61; 340/539.3; 370/328; 703/2

(58) Field of Classification Search ............... 370/328; 340/5.61, 5.27, 539.3; 703/2; 455/418
See application file for complete search history.

(56) References Cited

U.S. PATENT DOCUMENTS 4,357,601 A 11/1982 McWilliams (Continued)

FOREIGN PATENT DOCUMENTS

FR 2749607 12/1997

(Continued)

OTHER PUBLICATIONS

"Circuit Design for Electronic Instrumentation" by Darold Wobschall, pp. 367-369, 1987, no month listed.

*Primary Examiner*—William D. Cumming
(74) *Attorney, Agent, or Firm*—Michael Best & Friedrich LLP (57) ABSTRACT

In an access control system, a method and system for system management. The RF access control system includes a wireless panel interface module that transmits system component settings to a system management interface and receives configuration information from the interface. The system also includes a system management interface for retrieving component settings from the wireless panel interface module and generating configuration information to adjust the settings. The wireless panel interface module transmits the configuration information to system components. The system further includes a wireless access point module that receives configuration information from the wireless panel interface module via an RF communication link. An access processor adjusts settings of the wireless access point module based on the configuration information. A control processor adjusts settings of the wireless panel interface module based on the configuration information. The system also includes an access point controlled by the wireless access point module.

19 Claims, 5 Drawing Sheets

U.S. PATENT DOCUMENTS

| | | | |
|---|---|---|---|
| 4,672,365 A | 6/1987 | Gehman et al. | |
| 5,019,803 A | 5/1991 | Maram | |
| 5,075,608 A | 12/1991 | Erdman et al. | |
| 5,184,349 A | 2/1993 | Riordan | |
| 5,418,839 A | 5/1995 | Knuth et al. | |
| 5,461,372 A * | 10/1995 | Busak et al. | 340/5.27 |
| RE35,124 E | 12/1995 | Erdman et al. | |
| 5,475,375 A | 12/1995 | Barrett et al. | |
| 5,491,471 A | 2/1996 | Stobbe | |
| 5,497,411 A | 3/1996 | Pellerin | |
| 5,577,229 A | 11/1996 | Wakerly | |
| 5,602,536 A | 2/1997 | Henderson et al. | |
| 5,625,338 A * | 4/1997 | Pildner et al. | 340/539.3 |
| 5,682,135 A | 10/1997 | LaBonde et al. | |
| 5,705,991 A | 1/1998 | Kniffin et al. | |
| 5,774,059 A | 6/1998 | Henry et al. | |
| 5,808,296 A | 9/1998 | McMonagle et al. | |
| 5,812,782 A | 9/1998 | Jackson | |
| 5,847,662 A | 12/1998 | Yokota et al. | |
| 5,867,095 A | 2/1999 | Klein et al. | |
| 5,884,145 A | 3/1999 | Haartsen | |
| 5,901,361 A | 5/1999 | Luong | |
| 5,936,544 A | 8/1999 | Gonzales et al. | |
| 5,941,106 A | 8/1999 | Williamson, Jr. et al. | |
| 5,974,367 A | 10/1999 | Bianco | |
| 6,167,251 A | 12/2000 | Segal et al. | |
| 6,185,415 B1 | 2/2001 | Boatwright | |
| 6,237,028 B1 | 5/2001 | Jackson | |
| 6,260,392 B1 | 7/2001 | Geiger | |
| 6,285,295 B1 | 9/2001 | Casden | |
| 6,326,754 B1 | 12/2001 | Mullet et al. | |
| 6,352,202 B1 | 3/2002 | Takiguchi et al. | |
| 6,359,547 B1 | 3/2002 | Denison et al. | |
| 6,377,608 B1 | 4/2002 | Zyren | |
| 6,392,537 B1 | 5/2002 | Tazumi et al. | |
| 6,486,793 B1 | 11/2002 | Buccola | |
| 6,776,332 B1 | 8/2004 | Allen et al. | |
| 6,828,902 B1 | 12/2004 | Casden | |
| 2001/0021639 A1 | 9/2001 | Kaku | |
| 2001/0055283 A1 * | 12/2001 | Beach | 370/328 |
| 2002/0163430 A1 | 11/2002 | Bergman et al. | |
| 2003/0025082 A1 | 2/2003 | Brewington et al. | |
| 2003/0096607 A1 | 5/2003 | Taylor | |
| 2003/0098778 A1 * | 5/2003 | Taylor et al. | 340/5.61 |
| 2003/0098779 A1 | 5/2003 | Taylor et al. | |
| 2003/0100266 A1 | 5/2003 | Wiemeyer et al. | |
| 2003/0103472 A1 | 6/2003 | Taylor et al. | |
| 2003/0143956 A1 | 7/2003 | Taylor | |
| 2004/0099723 A1 | 5/2004 | Robertson | |
| 2004/0236547 A1 * | 11/2004 | Rappaport et al. | 703/2 |
| 2005/0003812 A1 | 1/2005 | Gladwin et al. | |

FOREIGN PATENT DOCUMENTS

| | | |
|---|---|---|
| WO | WO 02/25040 | 3/2002 |

* cited by examiner

SYSTEM MANAGEMENT INTERFACE FOR RADIO FREQUENCY ACCESS CONTROL

RELATED APPLICATIONS

The present application claims priority to the following provisional applications, all filed Sep. 30, 2001: Application No. 60/326,338, entitled "RF Channel Linking Method and System"; Application No. 60/326,299, entitled "Energy Saving Motor-Driven Locking Subsystem"; Application No. 60/326,201 entitled "Cardholder Interface for an Access Control System"; Application No. 60/326,316, entitled "System Management Interface for Radio Frequency Access Control"; Application No. 60/326,298 entitled "Power Management for Locking System"; Application No. 60/326,179, entitled "General Access Control Features for a RF Access Control System"; Application No. 60/326,296, entitled "RF Wireless Access Control for Locking System"; Application No. 60/326,294, entitled "Maintenance/Trouble Signals for a RF Wireless Locking System"; and Application No. 60/326,295, entitled "RF Dynamic Channel Switching Method."

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The preferred embodiments of the present invention relate to an RF access control system for controlling access to an access point. More specifically, the preferred embodiments of the present invention relate to a system and method for system management in an RF access control system.

A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust that a single wire.

However, one difficulty often encountered in installing and maintaining such a wireless access system is system management. For example, system components may perform differently when used in different applications or circumstances. Wireless system components may be unable to adapt to changing needs or situations.

Consequently, system components may be inefficiently designed to account for a variety of uses. Manual adjustment may be needed to re-configure a wireless access system. A system that provides management of system components would be highly desirable. Additionally, a system with components that may be configurable by the system would be highly desirable. Also, a system with components including parameters that may be configured differently depending upon a particular use would also be highly desirable.

BRIEF SUMMARY OF THE INVENTION

Preferred embodiments of the present invention provide a method and system for system management in an access control system. The RF access control system includes a wireless panel interface module that transmits system component settings to a system management interface and receives configuration information from the interface. The system also includes a system management interface for retrieving component settings from the wireless panel interface module and generating configuration information to adjust the settings. The wireless panel interface module transmits the configuration information to system components. The system further includes a wireless access point module that receives configuration information from the wireless panel interface module via an RF communication link. An access processor adjusts settings of the wireless access point module based on the configuration information. A control processor adjusts settings of the wireless panel interface module based on the configuration information. The system also includes an access point controlled by the wireless access point module.

The method for system management includes transmitting system configuration information to an RF access control system and adjusting settings of components in the RF access control system based on the configuration information. The method also includes connecting a data port of the RF access control system to a system management interface. The method further includes retrieving system settings and/or system status from the RF access control system. Transmission may be by wired or wireless communication link. Settings of a wireless access point module and/or a wireless panel interface module are adjusted. The configuration information may include heartbeat time, relock time, re-latch, conversion, signal polarity, extended unlock, channel selection, re-try, re-query, indicator control, and/or request to exit. The configuration information may also include status information, address information, and/or link information. The method may also include testing or monitoring system settings and/or system status. The method may also include encrypting the configuration information and/or the system settings to provide secure communication.

DETAILED DESCRIPTION OF THE INVENTION

The present application is directed toward a portion of a wireless access system. Additional disclosure of the wireless access system may be found in the following co-filed applications which are hereby incorporated by reference in their entirety: Application No. 60/326,338, entitled "RF Channel Linking Method and System" filed Sep. 30, 2002; Application No. 60/326,299, entitled "Energy Saving Motor-Driven Locking Subsystem" filed Sep. 30, 2002; Application No. 60/326,201, entitled "Cardholder Interface for an Access Control System" filed Sep. 30, 2002; Application No. 60/326,316, entitled "System Management Interface for Radio Frequency Access Control" filed Sep. 30, 2002; application Ser. No.60/326,298, entitled "Power Management for Locking System" filed Sep. 30, 2002; Application No. 60/326,179, entitled "General Access Control Features for a RF Access Control System" filed Sep. 30, 2002; Application No. 60/326,296, entitled "RF Wireless Access Control for Locking System" filed Sep. 30, 2002; Application No. 60/326,294, entitled "Maintenance/Trouble Signals for a RF Wireless Locking System" filed Sep. 30, 2002; and Application No. 60/326,295, entitled "RF Dynamic Channel Switching Method" filed Sep. 30, 2002.

Figure 1:
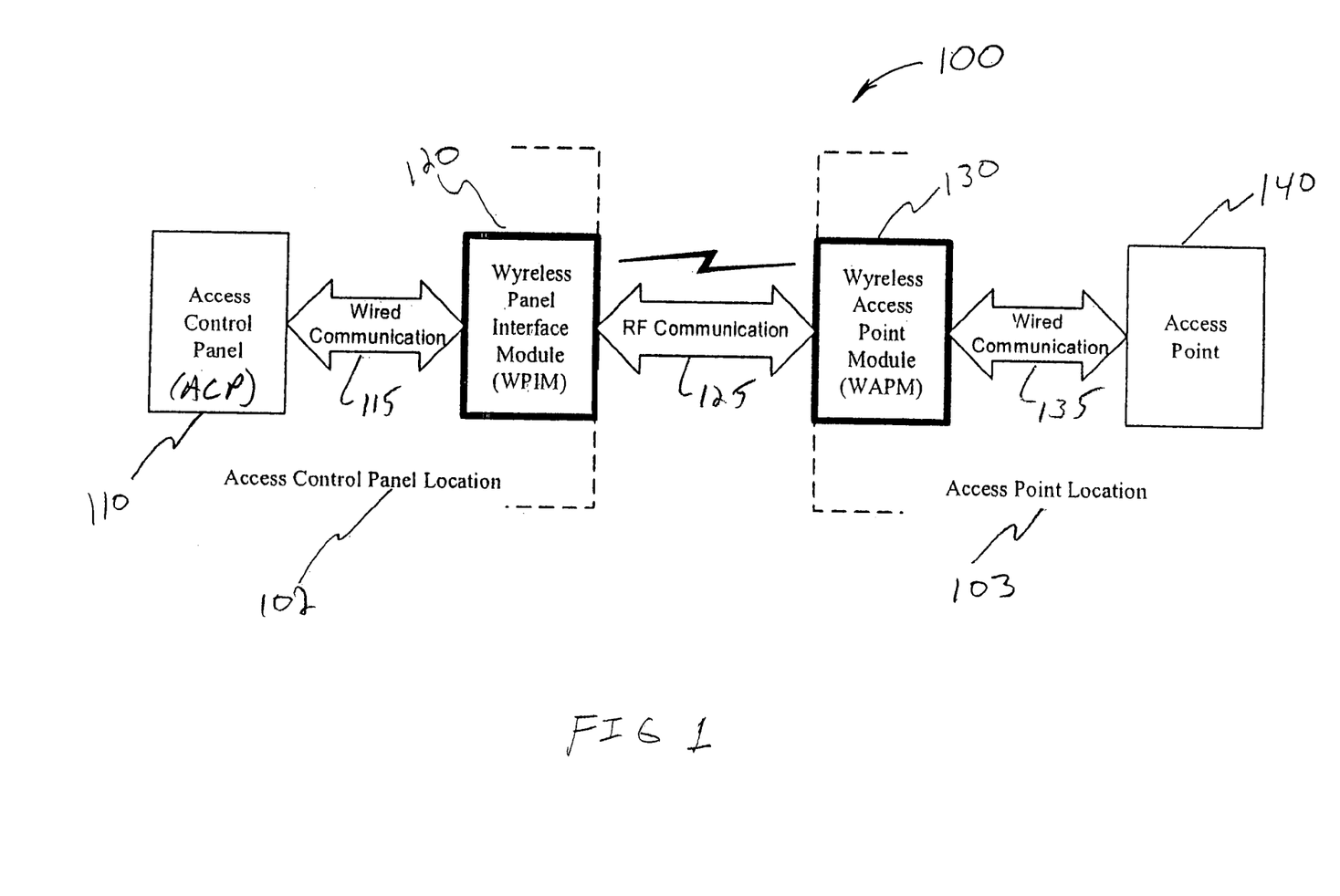
FIG. 1 illustrates a block diagram of the components of a wireless access system according to a preferred embodiment of the present invention.

FIG. 1 illustrates a block diagram of the components of a wireless access system 100 according to a preferred embodiment of the present invention. The wireless access system 100 includes several components installed at one of two generalized locations, an access control panel location 102 and an access point location 103. The access control panel location 102 includes an access control panel (ACP) 110 and a Wireless Panel Interface Module (WPIM) 120. The access point location 103 includes a Wireless Access Point Module (WAPM) 130 and an access point 140. The access control panel 110 communicates with the WPIM 120 through a bi-directional wired communication link 115. The WPIM 120 communicates with the WAPM 130 through a bi-directional RF communication link 125. The WAPM 130 communicates with the access point 140 through a bi-directional wired communication link 135. The access point 140 is preferably a door or portal, but may be a container, secure location, or a device of some kind, for example.

The present application is directed toward a portion of a wireless access system. Additional disclosure of the wireless access system may be found in the following co-filed applications which are hereby incorporated by reference in their entirety: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,194, entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application No. 10/262,508, entitled "Maintenance/Trouble Signals for a RF Wireless Locking System" filed Sep. 30, 2002; and application Ser. No. 10/262,409, entitled "RF Dynamic Channel Switching Method" filed Sep. 30, 2002.

Once the WAPM 130 receives the access signal from the access point 140, the WAPM 130 transmits the access signal to the WPIM 120 over the RF communication link 125. The WPIM 120 receives the access signal and relays the access signal to the ACP 110 over the wired communication link 115.

Figure 2:
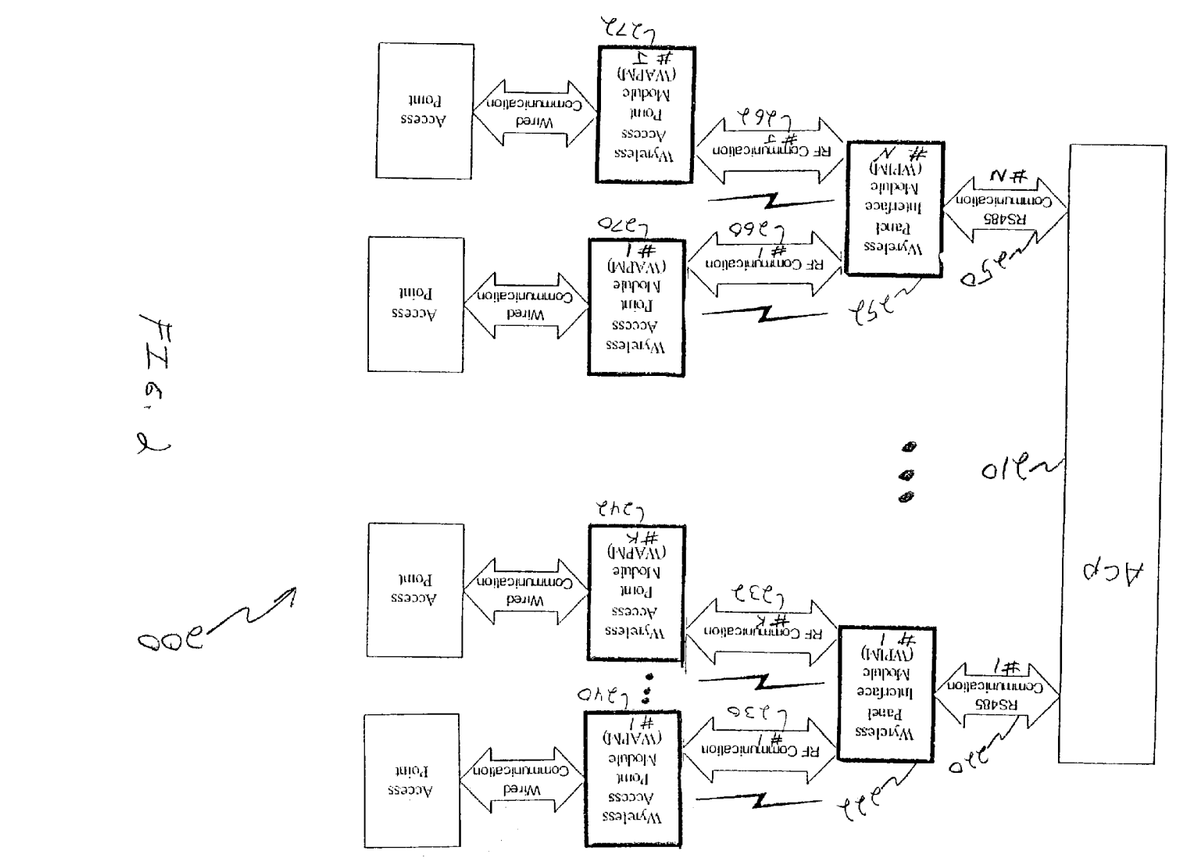
FIG. 2 illustrates a block diagram of the components of an expanded wireless access system according to a preferred embodiment of the present invention.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 2323, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

In the expanded wireless access system 200, a single ACP 210 communicates with a number N of WPIMs 222, 252 over a number N of wired communication links 220, 250. That is, the ACP supports communication with and provides access decisions for plurality of WPIMs 222, 252. Each WPIM 222, 252 may in turn support a plurality of WAPMs 240, 242, 270, 272 each WAPM positioned at a single access point. For example, WPIM #1 communicates with a number K of WAPMs 240, 242 over a number K of RF communication links 230, 232. Additionally, WPIM #N communicates with a number J of WAPMs 270, 272 over a number J of RF communication links 260, 262.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 232, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

Figure 3:
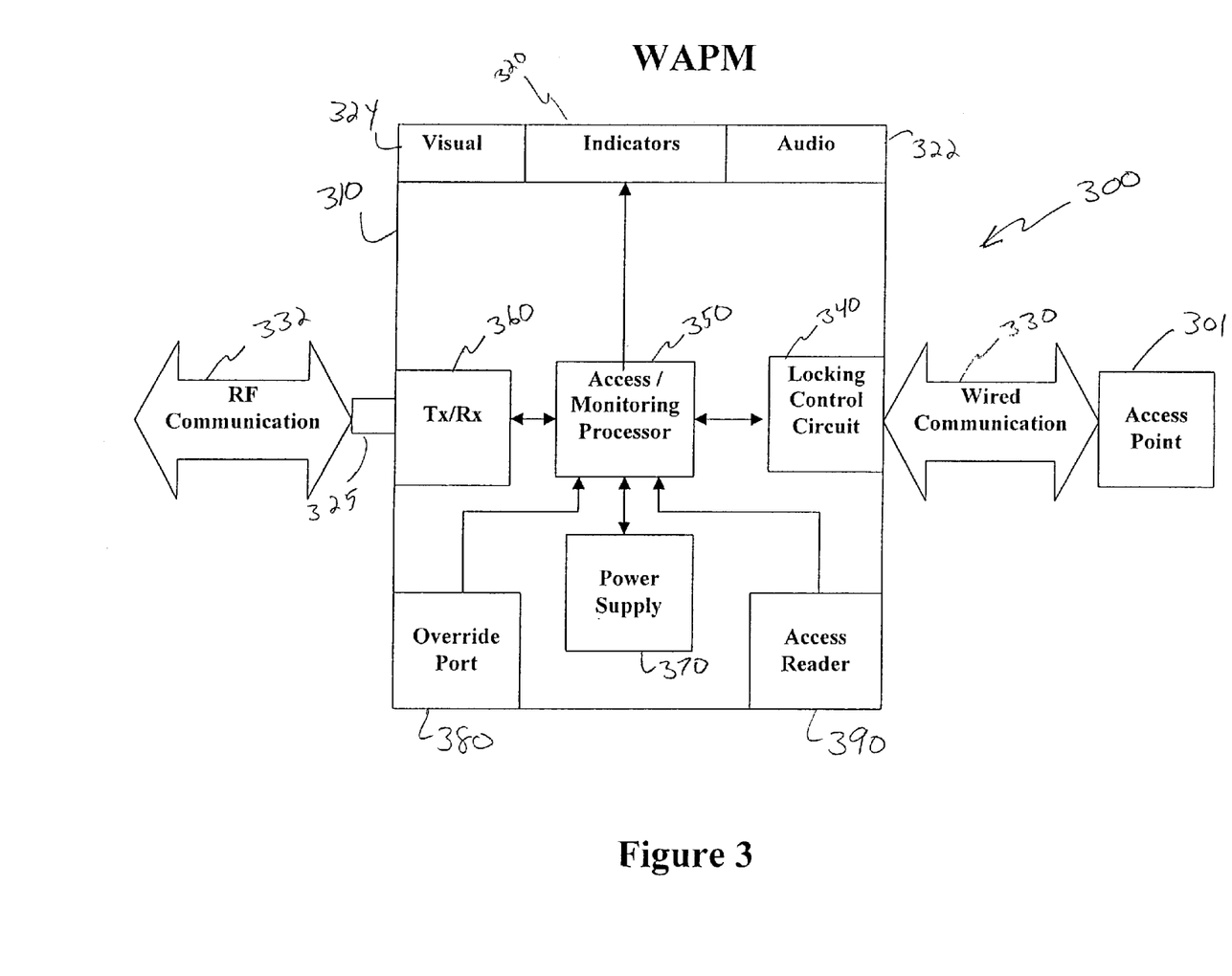
FIG. 3 illustrates a Wireless Access Point Module (WAPM) for the wireless access system of FIG. 1 according to a preferred embodiment of the present invention.

FIG. 3 illustrates a Wireless Access Point Module (WAPM) 300 for the wireless access system 100 of FIG. 1 according to a preferred embodiment of the present invention. The WAPM 300 includes a housing 310, indicators 320, a wired communication link 330, a RF communication link 332, and an antenna 325. The housing 310 includes a locking control circuit 340, an access/monitoring processor 350, a transceiver 360, a power supply 370, an override port 380, and an access reader 390. The indicators 320 may include one or both of an audio indicator 322 and a visual indicator 324. An access point 301 is also shown in FIG. 3.

The power supply 370 provides power to all of the other systems of the housing 310, including the transceiver 360, the locking control circuit 340, and the access/monitoring processor 350. The power supply 370 may be an internal battery or other internal type of power supply. Alternatively, an AC power supply may be employed. The transceiver 360 is coupled to the antenna 325 to allow signals to be sent and received from the housing 310 to an external point such as a WPIM through the RF communication link 332. The locking control circuit 340 is coupled to the access point 301 and provides locking control signals to the access point 301 through the wired communication link 330. Additionally, the locking control circuit 340 may receive feedback from the access point 301 through the wired communication link 330, for example to verify that the access point is secured. The access reader 390 receives access signals such as from an integrated card reader or other access device, for example. The indicators 320 may provide a visual or audio indication, for example, of the state of the WAPM 300 or that an access signal has been read by the access reader 390.

In operation, an access signal may be received from the access reader 390. The access signal is then relayed to the access/monitoring processor 350. The access/monitoring processor 350 then sends the access signal to the transceiver 360. The transceiver 360 transmits the access signal to WPIM 120 of FIG. 1 that is interfaced to the ACP 110. As further explained below, the ACP 110 includes a database of authorized access signals. If the access signal received from the WAPM 300 is determined by the ACP 110 to be a signal corresponding to an authorized user, a confirmation is transmitted from the ACP 110 to the WPIM 120 and then to the transceiver 360 of the WAPM 300. The confirmation is relayed from the transceiver 360 to the access/monitoring processor 350. The access/monitoring processor 350 then sends a locking control signal to the locking control unit 340. When the locking control unit 340 receives the locking control signal, the locking control unit 340 activates the access point 301 through the wired communication link 330 to allow access. The indicators 320 may be a visual or audible signal that the housing 310 has read an access signal, transmitted the access signal to the remote access control panel, received a confirmation, or activated the locking member, for example.

The WAPM 300 may include several variations. For example, the WAPM may be an Integrated Reader Lock (IRL), a Wireless Reader Interface (WRI), a Wireless Integrated Strike Interface (WISI), a Wireless Universal Strike Interface (WUSI), or a Wireless Portable Reader (WPR). The IRL includes an integrated access reader and lock. That is, the IRL is similar to FIG. 3, but includes the access point as part of the housing. The WRI is similar to the IRL, but does not include an integrated access reader and instead receives signals from a third party access reader. The WISI includes an integrated reader and lock and is mounted directly into the strike of the access point, such as a door, for example. The WUSI is similar to the WISI, but does not include an integrated reader and lock and may instead be connected to a third party reader and/or lock. The WPR is a portable reader that may be taken to a remote location and determine access decisions at the remote location, for example, for security checks or badging checks.

Figure 4:
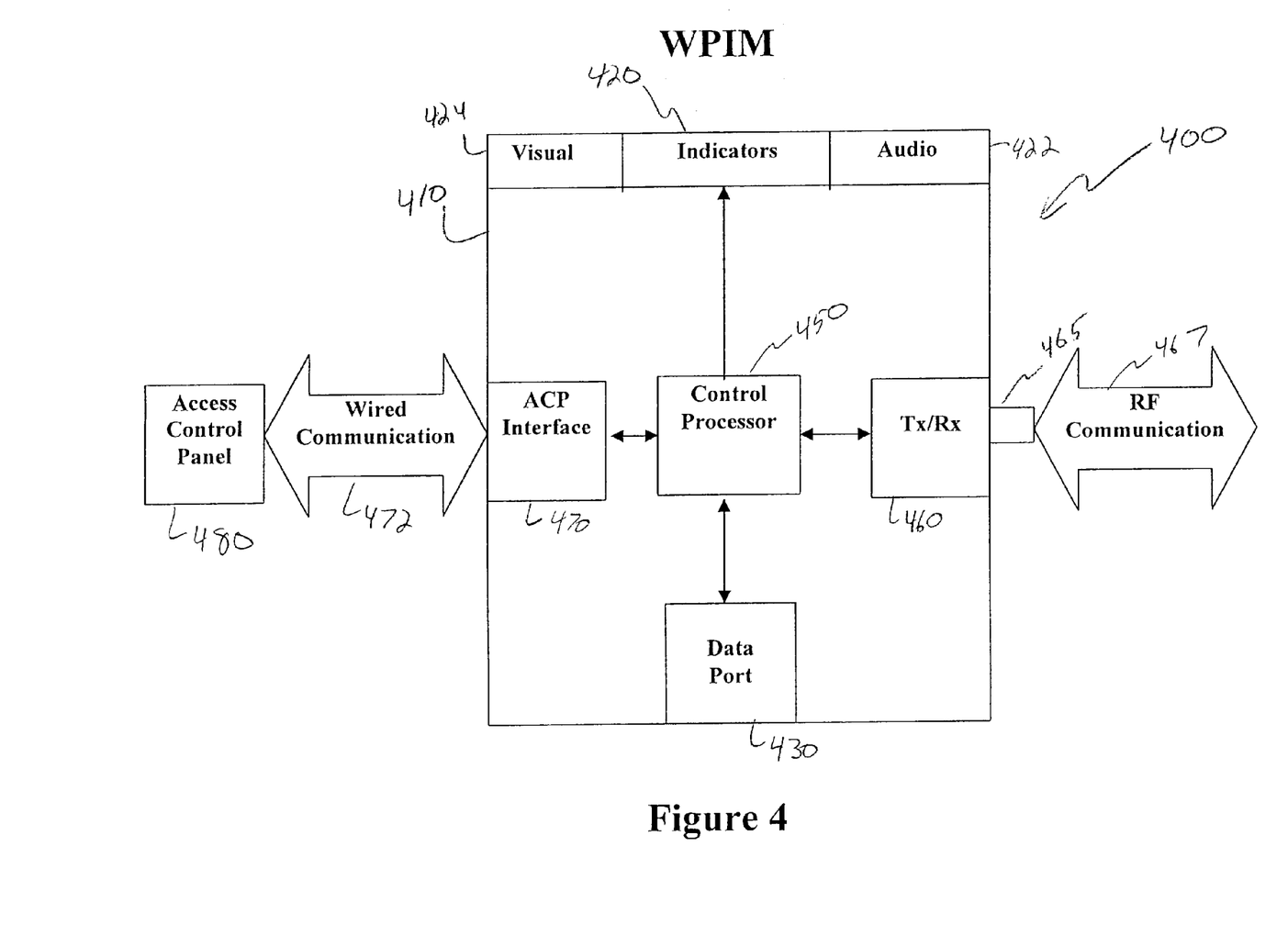
FIG. 4 illustrates a WPIM for the wireless access system of FIG. 1 according to a preferred embodiment of the present invention.

FIG. 4 illustrates a WPIM 400 for the wireless access system 100 of FIG. 1 according to a preferred embodiment of the present invention. The WPIM 400 includes a housing 410, an antenna 465, and indicators 420. The housing 410 includes a data port 430, a control processor 450, a transceiver 460 and an ACP interface 470. FIG. 4 also shows an RF communication link 467, a wired communication link 472, and an ACP 480.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual or audio indication, for example, of the state of the WPIM 400 or that an access signal has been passed to the ACP 480 or an authorization passed to a WAPM 300.

In operation, the WPIM 400 receives access signals from the WAPM 300 through the antenna 465 and transceiver 460. The WPIM relays the access signals to the ACP 480 for decision making. Once the access decision has been made, the ACP 480 transmits the access decision through the wired communication link 472 to the WPIM 400. The WPIM 400 then transmits the access decision to the WAPM 300.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual 424 or audio 422 indication, for example, of the state of the WPIM 400 or that an access signal has been passed to the ACP 480 or an authorization passed to a WAPM 300.

Additionally, configuration information may be received by the data port 430 of the WPIM 400 and relayed to the WAPM 300 via the transceiver 460. The configuration information that is received by the WAPM 300 may then by relayed to the access/monitoring processor 350 of the WAPM 300 for implementation at the WAPM 300.

The WPIM 400 may include several variations including a panel interface module (PIM) and a panel interface module expander (PIME). As mentioned above, a single PIM may communicate with multiple WAPMs. Additionally, the housing for the PIM is preferably constructed to allow additional PIM modules to be installed in the PIM housing to form the PIME. Because the PIME includes multiple PIM modules, the PIME may service more access points.

The features of one of the preferred embodiments present system management of system components for configurable system operation. In particular, system components such as the WAPM 300 and WPIM 400 may be configured. Components of the wireless access system 100 may include parameters that may be set and adjusted through system management.

Thus, one aspect of a preferred embodiment of the present invention is an access system that employs configuration information and system management to adjust system component parameters. As described above, configuration information may be received from the ACP 110 or another external source at the data port 430 of the WPIM 400 and transmitted to the WAPM 300 over the RF communication link 125.

Table 1 illustrates preferred configurable parameters at the WAPM 300.

TABLE 1

Configurable Parameters.

Heartbeat time (default: 10 minutes)
Relock time (default: 3 seconds)
Re-latch on: timer, door opening, or door closing (default: timer)
Card conversion (default: none)
Polarity of the Request-to-Exit (RTE) signal (default: low = RTE)
Polarity of Trouble signal (default: low = trouble)
Polarity of Door Position Switch (DPS) signal (default: low = closed)
Extended Unlock: enabled or disabled (default: enabled)

With regard to heartbeat time, periodically, the WPIM 400 and the WPAM 400 communicate even if no access request is received at the WAPM 300 in order to ensure that the communication link between the WPIM 400 and the WAPM 300 is still operational. The time between such checks is known as the heartbeat time. The heartbeat time is set at 10 minutes by default, but may be configured to any time. For example, if the heartbeat is set to a longer time, such as an hour, the power supply 370, may be able to power the WAPM 300 for a longer time because less power is drained due to the heartbeat.

With regard to the relock time, once the WAPM 300 has granted access, the WAPM 300 does not stay open permanently. Instead, the WAPM 300 relocks the door after a predetermined time to prevent unauthorized access. The default is for the WAPM 300 to relock 3 seconds after opening, but any timing may be configured.

With regard to the re-latch, as mentioned above, the WAPM 300 may re-lock the door under certain conditions. For example, the WAPM 300 may re-lock the door after a certain re-lock time has passed, or when the door is closed or opened. The default is for the WAPM 300 to relock the door after the re-lock time has elapsed, as described above.

With regard to the card conversion, some access control panels use special card readers that perform a card data conversion in the reader. Most readers simply pass on the data as read from the card. When a system uses the type of readers that perform a conversion, then in order for the WAPM 300 to operate on such a system, the WAPM 300 also provides the same conversion. Preferably, the WAPM 300 is able to perform at least four conversions and is upgradeable to support additional conversions. The card conversion configuration determines the type of conversion that the WAPM 300 performs, if any.

With regard to the polarity of the Request To Exit (RTE) signal, the RTE signal is a signal from the WPIM 400 to the access control panel 110. This configuration item is used to determine what state (polarity) of the signal (high or low) is used to indicate that a RTE is being made.

With regard to the polarity of the Trouble signal, the Trouble signal is a signal from the WPIM 400 to the access control panel 110. This configuration item is used to determine what state (polarity) of the signal (high or low) is used to indicate that there is a Trouble condition.

With regard to the polarity of the door position switch signal, the door position switch signal is a signal from the WPIM to the access control panel 110. This configuration item is used to determine what state (polarity) of the signal (high or low) is used to indicate that the door is open.

With regard to the extended unlock, the WAPM 300 may be configured to maintain an unlocked position with the locking control circuit 340 for an extended period of time.

Table 2 illustrates additional configurable parameters for the WAPM 300. These parameters may be used in addition to or in place of the parameters described above in relation to Table 1.

TABLE 2

Additional Configurable Parameters.

Which RF channel to use
Degrade mode: cache or facility code
Special card codes: low batter, degrade mode used, etc.
Re-try variables
Re-query variables
Card interface selection: magnetic (clock/data), Wiegand (data1/data0)
Test, monitor, install modes
Data Port Parameters - RS485 parameters: baud rate, data bits, parity, stop bits, address
Request to exit time presented to the access control panel
Indicator control With regard to the RF channel for use, the WAPM 300 preferably includes 15 RF channels which may be selected for use. In some application, it is desirable to limit the specific RF channels available for use. For example, if a strong interference source is present in one of the channels, it may be desirable to limit or exclude the channel having strong interference. This configuration item may limit the channels available for use.

With regard to degrade mode, the degrade mode operates in the WAPM 300 in the event that the WAPM 300 is unable to communicate with its WPIM 400. The degrade mode allows the WAPM 300 to make an access control decision by itself. Several degrade modes may be implemented, such as: unlock the door always when any card is swiped, unlock the door if the card contains a certain code on it (e.g., facility code), or unlock the door if the card has been used previously and recently at this door (e.g., if the card's data is stored in a cache memory at the WAPM 300). This configuration item selects what, if any, degrade mode should be used by the WAPM 300.

With regard to special card codes, in order to streamline communication between the ACP 110 and the WPIM 400, the WPIM 400 sends condition or status information to the ACP 110 in a data format similar to that used for access data (card swipes, for example). For example, the WPIM 400 may send a card code (as if a card had actually been swiped) to the panel 110 to indicate certain conditions, such as low battery for example. The access control panel 110 may then be configured to create an alarm, or other function, when it sees that card code, instead of rendering an access decision. This configuration item determines what, if any, special card codes are to be used.

With regard to re-try variables, the current RF signaling process preferably attempts up to three times (randomly spaced in time) to communicate successfully with a WPIM 400 from an WAPM 300. This configuration item is used to change the number of re-tries and time spacing between re-tries.

With regard to re-querying, re-querying includes the WAPM 300 asking the WPIM 400 if the WPIM 400 has gotten an answer from the access control panel 110 regarding whether access is granted or denied to the cardholder who has just swiped their card, for example. Preferably, the WAPM 300 queries the WPIM 400 5 times at 100 ms intervals (1 second total), before denying access. This configuration item is used to change the total number of queries and time spacing between queries.

With regard to card interface selection, when using the WAPM 300, the WAPM 300 may be connected to any of a variety of previously installed locking or access systems. Thus, the WAPM 300 may be configured to accept input from any of the previously installed locking or access systems. For example, the WAPM 300 may be configured to accept input from a card reader employing magnetic or Wiegand encoding of data.

With regard to test, monitor, and install modes, the WAPM 300 may be configured to provide testing and monitoring and processed through a predetermined sequence at startup. Preferably, testing, monitoring, installation, and the startup sequence may be configured.

With regard to the data port parameters, the data port 430 on the WPIM 400 may be configured to communicate as desired. For example, the baud rate, data bits, parity, stop bits address may all be configured.

With regard to Request To Exit time, preferably, the WAPM 300 asserts the RTE signal to the access control panel for as long as the Request to Exit switch is active (i.e. real time). Alternatively, when interfacing to some access control panels 110 the assertion time may be fixed, rather than real time. This configuration item determines whether the assertion time is real time or fixed, and if fixed, then the length of the fixed time.

With regard to the indicator controls, the indicators 320 of the WAPM 300 may be configured to display any of a variety of conditions and may display these conditions in any way desired (for example, visually through the visual indicators 324 and/or audibly through the audio indicators 322).

Additionally, in a preferred embodiment of the present invention, the WAPM 300 stores performance characteristics, preferably in the access/monitoring processor 350. The performance characteristics may include the data error rate between the WPIM 400 or the WPAM 300 or the number of access requests presented at the WAPM 300, or any other type of information.

Once the performance statistics have been gathered at the WAPM 300, the performance statistics may be sent to the WPIM 400 through the transceiver 360. Once the performance statistics have been received at the WPIM 400, the performance statistics may be relayed to an operator through the data port 430 for further analysis. Additionally, the WPIM 400 may also gather performance statistics which may be passed to the operator through the data port 430.

The performance statistics may be used, for example, to determine if the WAPM 300 and WPIM 400 should switch to a different communication channel. It may be desirable to switch the WAPM 300 and WPIM 400 to a different communication channel to improve the error rate between the WAPM 300 and WPIM 400, for example.

Additionally, in a preferred embodiment of the present invention, the WAPM 300 and WPIM 400 include flash programmable memory. Because the WAPM 300 and WPIM 400 include flash programmable memory, the WAPM 300 and WPIM 400 may be reprogrammed easily. For example, the flash memory of the WPIM 400 may be reprogrammed by an operator by sending commands through the data port 430 to the control processor 450 of the WPIM 400. Additionally, the WAPM 300 may be reprogrammed by sending commands from the WPIM 400 to the WAPM 300 through the transceiver 460. The commands may be received by the WAPM 300 and implemented.

In certain embodiments, communication between the WAPM 300 and WPIM 400 may be encrypted to help insure secure communication. Encryption information may be stored in the WAPM 300 and/or the WPIM 400, for example. Encryption information may be stored as a matrix (static or dynamic) or a one-time pad, for example.

In certain embodiments, the wireless access system 100 includes configuration and demonstration interface (not pictured) to configure the WAPM 300 and WPIM 400 and demonstrate system 100 functions. The interface includes a WPIM panel. The WPIM panel includes a WPTIM status tab that identifies WPIMs that are connected to the interface and lists status information (normal or error, for example). If a WPIM is not connected, the WPIM status tab lists available connections. The WPIM panel also includes WPIM Addresses tab that provide a place to view or change the address of the WPIM 400. The WPIM Addresses tab reflects current addresses of connected WPIMs. The WPIM Addresses tab also allows a change of access point 301 addresses that the WPIM 400 will respond to. Each WPIM 400 in the same RF coverage area has a different address. The WPIM panel further includes a WPIM Links tab that provides a place to start or stop a linking process for the WPIM 400 that is to be connected to the ACP 110 via the wired communication link 115.

The interface also includes an access point panel. Typically, one access point panel is created for each access point 301. Within each access point panel, there are four tabs—Status, Statistics, Activity, and Configuration. The type of WAPM 400 (IRL, WRI, WISI, WUSI, or WPR, for example) may also be displayed on the access point panel.

The Status tab of the access point panel displays the status of the WAPM 300 linked to the WPIM 400. The Status tab also displays data from card swipes. The Status tab displays whether the WAPM 300 allowed access or not. In a certain embodiment, a grant access flag may be set to allow access for all card swipes. The Status tab also includes motor stall which indicates whether or not the WAPM 300 locking control circuit 340 is functioning properly. Furthermore, battery status (okay or low, for example) for the power supply 370 in the WAPM 300 may also be displayed. Reader Tamper indicates whether a WAPM 300 reader has been tampered with ("Tamper") or not ("Ok"). Additionally, Door Status, such as a graphical display of door status, indicates whether the access point 301 is open or closed.

The Statistic tab of the access point panel provides a place to view and/or clear WAPM 300 and WPIM 400 statistics. Reading and resetting requests may be transmitted to the WPIM 400.

The Activity tab of the access point panel keeps track of card swipes, time of swipe, and card data when the interface is running.

The Configuration tab of the access point panel provides a means of viewing and changing WPIM 400 and WAPM 300 configurable settings. The Configuration tab allows configuration of WPIM 400 parameters when the WPIM 400 is connected to the interface. Initially, configuration settings of the WPIM 400 and WAPM 300 are synchronized in the Configuration tab. The settings may be adjusted in the Configuration tab and saved at the WPIM 400 and the WAPM 300.

The Configuration tab includes a heartbeat time that tells the WAPM 300 how often to send status messages to the WPIM 400. The heartbeat time may be changed in increments of hours, minutes, or seconds. Configuration also includes an extended unlock feature that allows the WPIM 400 to detect that an ACP 110 wants to keep an access point 301 unlocked for an extended period of time. For example, it may be desirable to leave a door unlocked during normal business hours and restrict access at all other times.

A request to exit feature may also be present to determine how the WAPM 300 handles a request to exit at the access point 301. For example, if request to exit is disabled, the WAPM 300 reports that a request to exit has occurred. If request to exit is enabled, the WAPM 300 reports that a request to exit has occurred and continues to requery the WPIM 400 (as in a card swipe) to determine if the access point 301 should be electronically unlocked. Request to exit may be disabled if the access point 301 does not need to electronically unlocked for exit. Request to exit may be enabled if the access point 301 is electronically unlocked.

A Hi/Lo Output setting in the Configuration tab control the output levels sent to an ACP 110 on detection of signals, such as Request-to-Exit (RTE), Door Position Switch (DPS), and Trouble, for example. Polarity of these signals is configurable.

A Re-latch feature controls the conditions under which an access point 301 automatically re-latches after a momentary unlock (i.e., a valid card swipe). One type of re-latch is a timed re-latch. After the access point 301 unlocks, the access point 301 may re-latch after a time set in Re-latch has expired. The access point 301 and locking control circuit 340 may also be set to re-latch when the access point 301 portal opens or closes, for example.

The Configuration tab may also allow conversion of card reader data from one format to another. Multiple conversions may be supported, such as none, reverse (read data from card in reverse), Northern #1 (Northern Computers NR-1-WR magstripe card reader format #1), Northern #2 (Northern Computers format #2), Northern #5 (Northern Computers format #5), or Northern #6 (Northern Computers format #6), for example.

The WAPM 300 may also be placed in a diagnostic mode in which the WAPM 300 continuously sends card data and unlock requests to the WPIM 400. The diagnostic mode is typically used for testing purposes.

A Latch Type field of the Configuration tab allows a locking/unlocking drive sequence of the WAPM 300 to be configured to be able to drive different door lock motors, jam strike motors, or jam strike solenoids, for example.

The Configuration tab also includes First, Delay, and Retry features that allow query timing of the WAPM 300 to be adjusted to accommodate ACPs 110 that have different response times. Proper adjustment of the First, Delay, and Retry fields may result in longer battery life and less repeat card swipes due to the ACP 110 taking too long to make an access grant decision. Each WAPM has a query function that decides how many times, how frequently, and how long the WAPM 300 will ask the WPIM 400, via RF communication 125, if the WAPM 300 should unlock (grant access) after a request for access has been made (i.e., a card swipe). For example, a first query is made when the card data is transmitted to the WPIM 400. A second query is made after the WAPM 300 waits the amount of time set by the First field. All subsequent queries are made after the WAPM 300 waits for the amount of time set by the Delay field. The queries stop (and access is denied) after a number of queries set in the Retry field have been sent.

Figure 5:
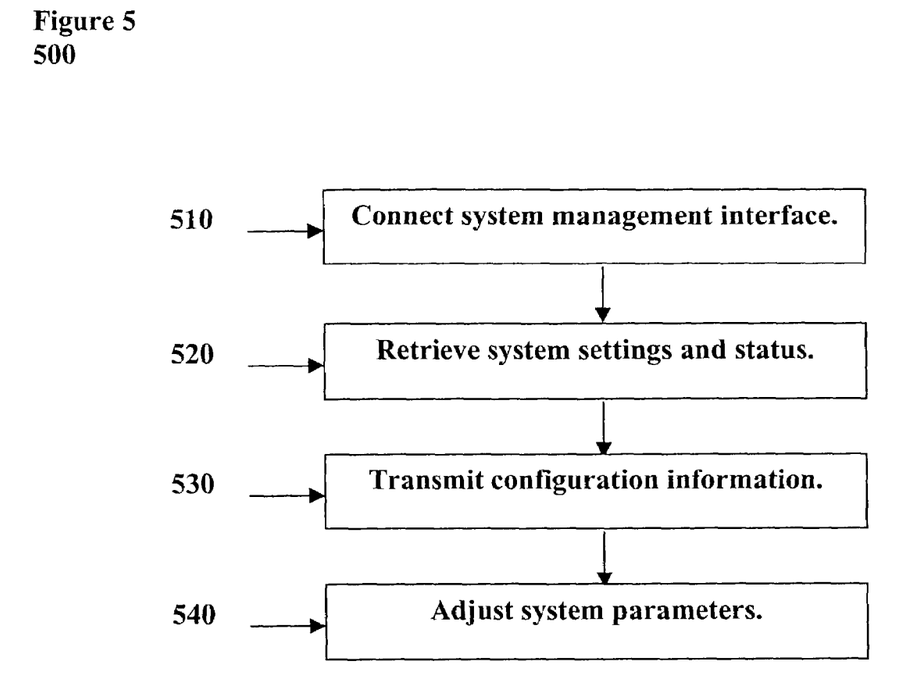
FIG. 5 illustrates a method for system management and configuration of system components.

FIG. 5 illustrates a method for system management and configuration of system 100 components. First, at step 510, a system management interface may be connected to the data port 430 of the WPIM 400. Then, at step 520, system 100 system settings and status (particularly the WPIM 400 and the WAPM 300) may be retrieved by the interface through the data port 430 of the WPIM 400. At step 530, configuration information may be transmitted. Configuration information may be transmitted to the WPIM 400 through the data port 430. Configuration information may be transmitted to the WAPM 300 via the RF communication link 125. Then, at step 540, parameters of system 100 components, such as the WPIM 400 and the WAPM 300 are adjusted according to the configuration information. Examples of system parameters and status are discussed above.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. An RF access control system operable to control access through a security system access point, the access control system comprising:
    an access point module associated with the security system access point;
    an access control panel operable to receive inputs regarding access control system configuration; and
    a panel interface module associated with the access control panel, wherein new system configuration information is entered at one of the access control panel and the panel interface module and transmitted wirelessly from the panel interface module to the access point module to reconfigure the panel interface module and the access point module, wherein the access control panel is substantially fixed with respect to the panel interface module.

2. The RF access control system of claim 1, further comprising a lock mechanism associated with the access point, the access point module connected to the lock mechanism via a wire.

3. The RF access control system of claim 1, wherein the panel interface module and the access control panel communicate between one another via a wire.

4. The RF access control system of claim 1, wherein the position of the access control panel is substantially fixed with respect to the panel interface module and the access point.

5. The RF access control system of claim 1, wherein the configuration information includes a heartbeat time.

6. The RF access control system of claim 1, wherein the configuration information includes a relock time.

7. The RF access control system of claim 1, wherein the configuration information includes at least one of a heartbeat time, a relock time, a re-latch on using timer, a re-latch on using door opening, a re-latch on using door closing, card conversion, a polarity of a request-to-exit (RTE) signal, a polarity of a trouble signal, a polarity of door position switch (DPS) signal, extended unlock enabled, extended unlock disabled, RF channel, degrade modes including cache and facility code, special card codes including low battery and degrade mode used, re-try variables, re-query variables, card interface selections including magnetic with clock and data and Wiegand with data1/data0, test, monitor, install modes, data port parameters including baud rate, data bits, parity, stop bits, and address, RS485 parameters including baud rate, data bits, parity, stop bits, and address, a request-to-exit time presented to the access control panel, and an indicator control.

8. An RF access control system operable to control access to a plurality of access points, the RF access control system comprising:
   a plurality of access point modules, each access point module associated with one of the plurality of access points;
   a plurality of panel interface modules, each panel interface module associated with at least one access point module; and
   an access control panel adapted to receive system configuration information and deliver the system configuration information to at least one of the plurality of panel interface modules, the panel interface modules operable to wirelessly transmit the configuration information to at least one of the associated access point modules.

9. The RF access control system of claim 8, further comprising a plurality of lock mechanisms each lock mechanism associated with one of the access points, each access point module connected to the associated lock mechanism via a wire.

10. The RF access control system of claim 8, wherein a plurality of wires provide for communication between the access control panel and each of the panel interface modules.

11. The RF access control system of claim 8, wherein the position of each of the access control panels is substantially fixed with respect to the panel interface modules and the access points.

12. The RF access control system of claim 8, wherein the configuration information includes a heartbeat time.

13. The RF access control system of claim 8, wherein the configuration information includes a relock time.

14. The RF access control system of claim 8, wherein the configuration information includes at least one of a heartbeat time, a relock time, a re-latch on using timer, a re-latch on using door opening, a re-latch on using door closing, card conversion, a polarity of a request-to-exit (RTE) signal, a polarity of a trouble signal, a polarity of door position switch (DPS) signal, extended unlock enabled, extended unlock disabled, RF channel, degrade modes including cache and facility code, special card codes including low battery and degrade mode used, re-try variables, re-query variables, card interface selections including magnetic with clock and data and Wiegand with data1/data0, test, monitor, install modes, data port parameters including baud rate, data bits, parity, stop bits, and address, RS485 Parameters including baud rate, data bits, parity, stop bits, and address, a request-to-exit time presented to the access control panel, and an indicator control.

15. The RF access control system of claim 8, wherein the configuration information is transmitted wirelessly to each of the plurality of access point modules substantially simultaneously.

16. The RF access control system of claim 8, wherein each panel interface module is associated with at least two access point modules.

17. A method of managing system configuration in an RF access control system, the RF access control system operable to control access to a plurality of access points, at least one of the access points having a fixed position, the method comprising:
   providing an access control mechanism associated with each access point;
   physically connecting an access point module to each of the access control mechanisms;
   inputing system configuration information into an access control panel;
   communicating the system configuration information to at least one of a plurality of panel interface modules;
   sending an RF signal from the at least one panel interface module to at least one of the access point modules, the RF signal including system configuration information; and
   reconfiguring at least one of the panel interface modules at least one of the access point modules, or at least one of the access control mechanisms in response to the system configuration information.

18. The method of claim 17, wherein the RF signal is transmitted substantially simultaneously to each of the plurality of access point modules to reconfigure each of the access point modules or the access control mechanisms.

19. The method of claim 17, wherein the configuration information includes at least one of a heartbeat time, a relock time, a re-latch on using timer, a re-latch on using door opening, a re-latch on using door closing, card conversion, a polarity of a request-to-exit (RTE) signal, a polarity of a trouble signal, a polarity of door position switch (DPS) signal, extended unlock enabled, extended unlock disabled, RF channel, degrade modes including cache and facility code, special card codes including low battery and degrade mode used, re-try variables, re-query variables, card interface selections including magnetic with clock and data and Wiegand with data1/data0, test, monitor, install modes, data port parameters including baud rate, data bits, parity, stop bits, and address, RS485 parameters including baud rate, data bits, parity, stop bits, and address, a request-to-exit time presented to the access control panel, and an indicator control.

* * * * *